United States Patent [19]  [11] 4,064,842
Sherrill  [45] Dec. 27, 1977

[54] INJECTOR FOR INTRODUCING A LIQUID INTO THE CYLINDERS OF AN INTERNAL COMBUSTION ENGINE

[76] Inventor: John F. Sherrill, Box L, Plymouth, Ind. 46563

[21] Appl. No.: 749,388

[22] Filed: Dec. 10, 1976

Related U.S. Application Data

[63] Continuation of Ser. No. 568,978, April 17, 1975, abandoned.

[51] Int. Cl.² .................................................. F02D 19/00
[52] U.S. Cl. ................................. 123/25 L; 123/198 A
[58] Field of Search ................ 123/25 R, 25 A, 25 J, 123/25 K, 25 L, 25 M, 198 A; 261/18 A

[56] References Cited

U.S. PATENT DOCUMENTS

| 1,398,095 | 11/1921 | Fokken et al. | 123/25 L |
| 1,627,139 | 5/1927 | Bertschy | 123/25 L |
| 1,964,892 | 7/1934 | Novotny | 123/25 A |
| 2,611,345 | 9/1952 | Sudmeier | 123/25 R |
| 2,742,024 | 4/1956 | Oberdier | 123/25 R |
| 2,756,729 | 7/1956 | Wolcott | 123/25 L |
| 2,772,866 | 12/1956 | Ridley et al. | 123/25 L X |
| 3,865,907 | 2/1975 | Rock | 123/25 L X |

Primary Examiner—Charles J. Myhre
Assistant Examiner—Ira S. Lazarus
Attorney, Agent, or Firm—Oltsch & Knoblock

[57] ABSTRACT

An injector having a bore with an inlet and outlet therein and a vacuum responsive piston slidable within the bore. The piston carries a valve part which in conjunction with the inlet into the housing serves to regulate liquid flow being drawn from a reservoir through the housing and injected into the cylinders of the internal combustion engine in a manner responsive to the amount of vacuum created within the engine cylinders.

10 Claims, 12 Drawing Figures

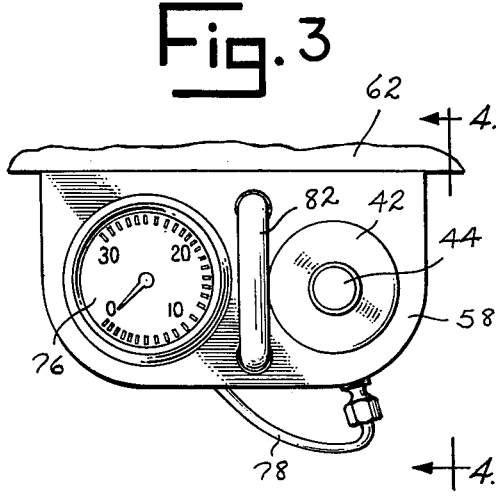
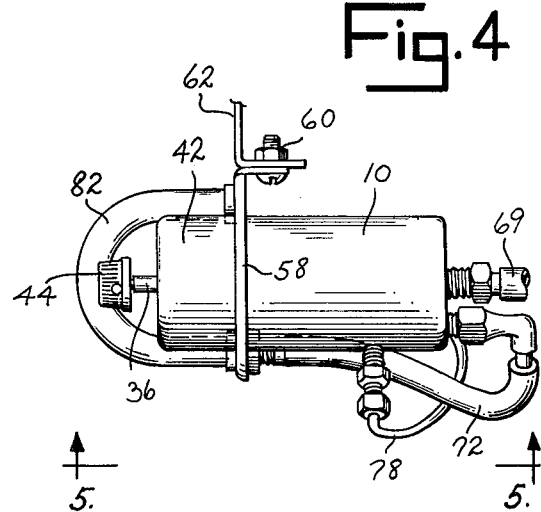
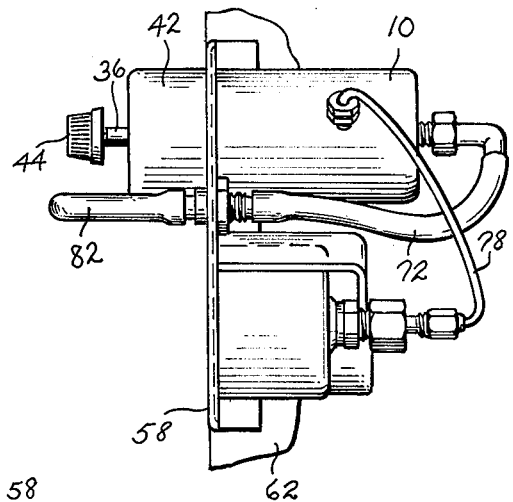
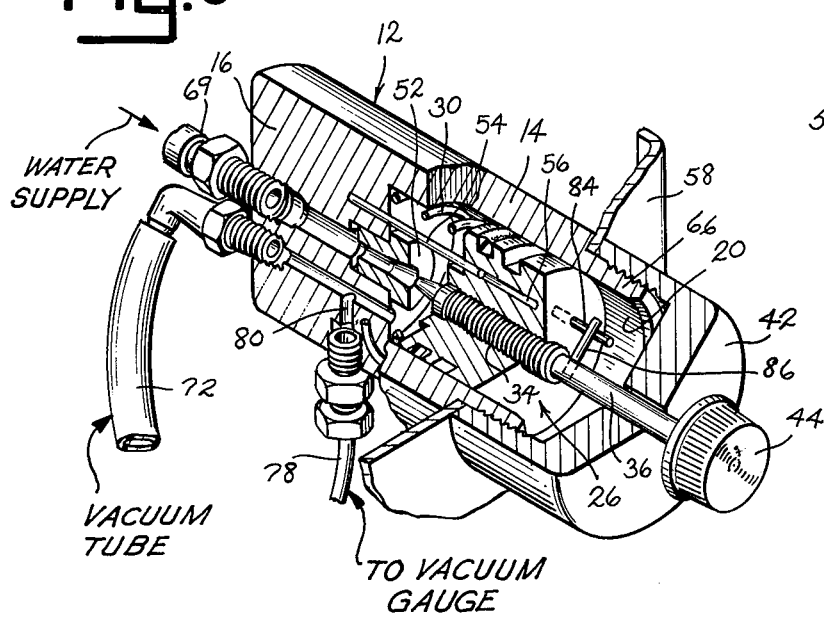

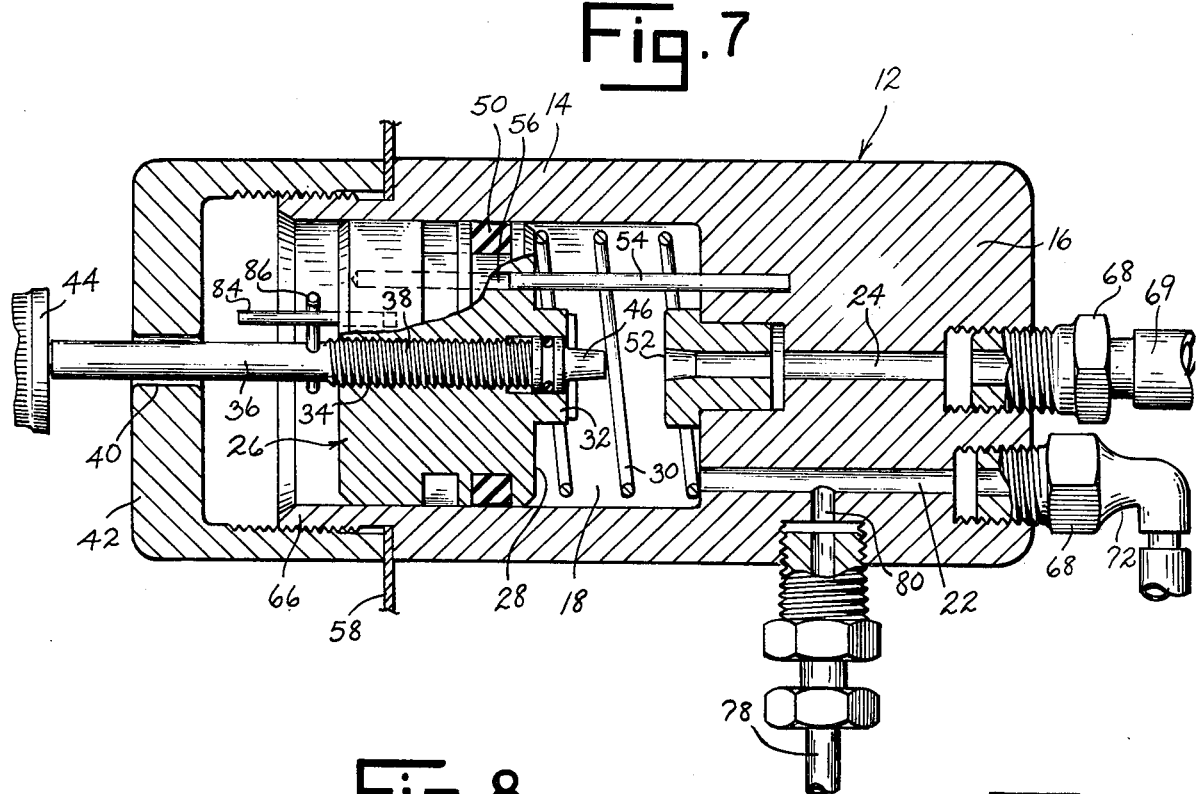
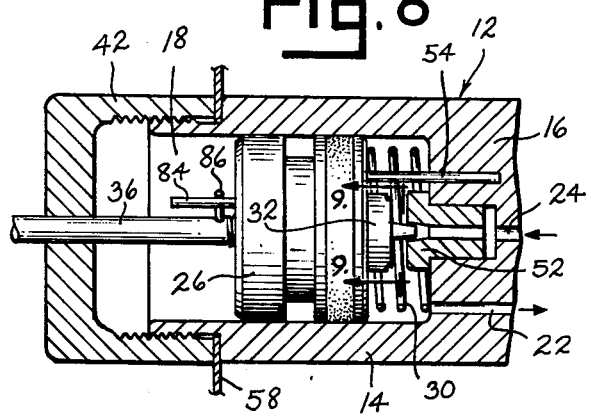
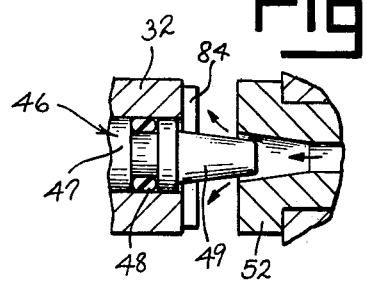
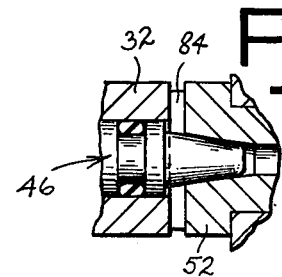
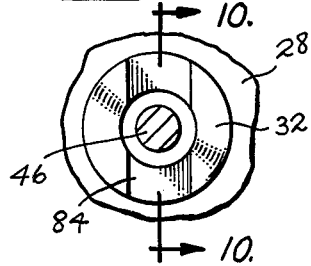
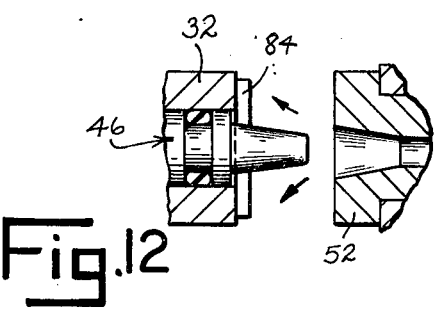

INJECTOR FOR INTRODUCING A LIQUID INTO THE CYLINDERS OF AN INTERNAL COMBUSTION ENGINE

This is a continuation of application Ser. No. 568,978, filed Apr. 17, 1975, now abandoned.

BACKGROUND OF THE INVENTION

This invention relates to an injector utilized for introducing a liquid such as water into the cylinders of an internal combustion engine.

It has long been known that certain materials including water when injected into the combustion chamber of an internal combusion engine increases the combustion efficiency of the engine with a resultant increase in gas mileage and engine power, and a decrease in the residual products of combustion. Water introduced into the combustion chamber of an engine changes the burning characteristics of the gasoline and air mixture to allow the flame propogation to travel more evenly through the combustion chamber upon ignition. This action extends the burning time of the fuel to provide a more even and lasting delivery of power to the pistons of the engine and reduces the residual components or pollutants emitted from the engine as exhaust.

In this invention an injector of unique design is utilized to inject a liquid such as water into the cylinders of an internal combustion engine at a flow rate depending upon the amount of vacuum created within the engine.

SUMMARY OF THE INVENTION

This invention relates to an injector used in conjunction with an internal combustion engine for introducing a liquid into the cylinders of the engine. A vacuum responsive piston is slidably positioned within a bore in the injector housing. A liquid inlet and outlet are provided in the bore. The piston carries valve means which, depending upon the position of the piston within the injector housing bore, regulates the liquid flow rate through the injector and into the cylinders of the engine. The inlet into the injector bore is connected to a liquid source and the outlet into the bore is placed in communication with the combustion chamber area of the cylinders. The vacuum created within the cylinders during engine use causes the liquid to be drawn from the liquid source through the injector and into the cylinders, with the amount of vacuum created by the engine determining the position of the piston and its valve means within the injector housing and therefore the flow rate of the liquid into the engine cylinders.

This injector when utilized with an internal combustion engine for the purpose of introducing water into the engine chambers reduces the carbon monoxide, hydrocarbons and nitrogen oxide emitted from the engine as exhaust. Additionally, the operating temperature of the engine is reduced. Combustion efficiency and gas mileage is increased if the injector is utilized in an automobile or similar vehicle, and the life of the sparkplugs and vehicle exhaust system is prolonged.

Accordingly, it is an object of this invention to provide an injector which is used in combination with an internal combustion engine and which introduces a liquid into the cylinders of the engine in response to the amount of vacuum created within the engine.

Another object of this invention is to provide a water injector for an internal combustion engine which improves the engine's efficiency as well as reduces the emission of pollutants of the engine.

Still another object of this invention is to provide a water injector for use with an internal combustion engine and which is of economical construction and of simple maintenance.

Other objects of this invention will become apparent upon a reading of the invention's description.

BRIEF DESCRIPTION OF THE DRAWINGS

A preferred embodiment of this invention has been chosen for purposes of illustration and description wherein:

FIG. 3 is a front view of the injector and its component parts mounted to the dash of the automobile.

FIG. 4 is a side view of the mounted injector taken along line 4—4 of FIG. 3.

FIG. 5 is a bottom view of the mounted injector taken along line 5—5 of FIG. 4.

FIG. 6 is a fragmentary sectional view of the mounted injector.

FIG. 7 is a longitudinal sectional view of the injector showing the piston thereof in one operative position.

FIG. 8 is a fragmentary longitudinal sectional view of the injector showing the piston thereof in another operative position.

FIG. 9 is a fragmentary sectional view taken along line 9—9 of FIG. 8.

FIGS. 10, 11 and 12 are fragmentary sectional views of the valve component which is carried by the piston of the injector and shown in various operative positions.

DESCRIPTION OF THE PREFERRED EMBODIMENT

Figure 1:
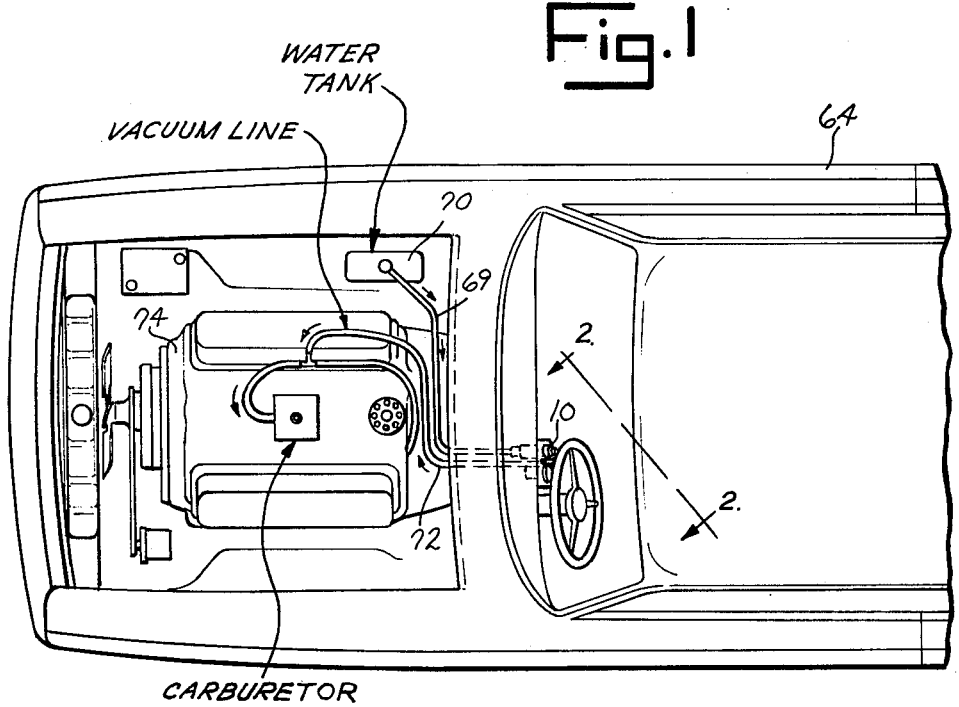
FIG. 1 is a fragmentary plan view of the engine and driver compartments of an automobile showing the injector of this invention operatively associated with the engine of the automobile.

The preferred embodiment illustrated is not intended to be exhaustive or to limit the invention to the precise form disclosed. It has been chosen and described in order to best explain the principles of the invention and its application and practical use to thereby enable others skilled in the art to best utilize the invention.

The injector 10 is illustrated in detail in FIGS. 6—11 and includes a housing 12. Housing 12 has a side wall 14 and an end wall 16 which cooperate to define a bore 18 having a cylindrical side wall surface 20. An outlet passage 22 and an inlet passage 24 extend through housing 12 at its end wall 16 and communicate with bore 18.

A piston 26 is fitted within housing bore 18 and is shiftable between the position shown in FIG. 7 and the position shown fragmentally in FIG. 11. As piston 26 shifts within housing bore 18, its end 28 moves toward and away from end wall 16 of the housing and outlet 22 and inlet 24 therein. A helical spring 30 is positioned within housing bore 18 with one end abutting piston end 28 and its opposite end abutting end wall 16 of the housing. Spring 30 serves to normally urge piston 26 away from housing end wall 16, as shown in FIG. 7. End face 28 of piston 26 includes a boss 32. A threaded bore 34 extends longitudinally through piston 26 and boss 32. A stem 36 is threaded into piston bore 34 and is rotatable relative to the piston. One end of stem 36 extends through an opening 40 in a cap 42 which is threaded onto housing 12, covering bore 18. A knob 44 is attached to the outer end of stem 36 to enable the stem to be rotated within piston 26.

The inner end of stem 36 is formed into a valve part 46. Valve part 46 has a cylindrical base 47 which carries an O-ring 48 and a truncated cone portion 49. O-ring 48 of valve part 46 fits within a smooth sided enlarged bore part formed at the inner end of piston bore 34. An O-ring 50 is fitted within a cylindrical groove formed about piston 26 and contacts side wall surface 20 of bore 18. Inlet 24 in end wall 16 of housing 12 is provided with a tapered valve seat 52. Valve part 46 carried by piston 26 is aligned with valve seat 52 so that upon shiftable movement of the piston within housing bore 18 the valve part will enter valve seat 52 as shown in FIGS. 10 and 11. A guide rod 54 is anchored at one end in end wall 16 of housing 12. The free end of rod 54 is slidably received within a bore 56 in piston 26. Piston 26 shifts upon guide rod 54 with the rod serving as a retainer means which prevents rotation of the piston within bore 18 upon the turning of stem 36.

Figure 2:
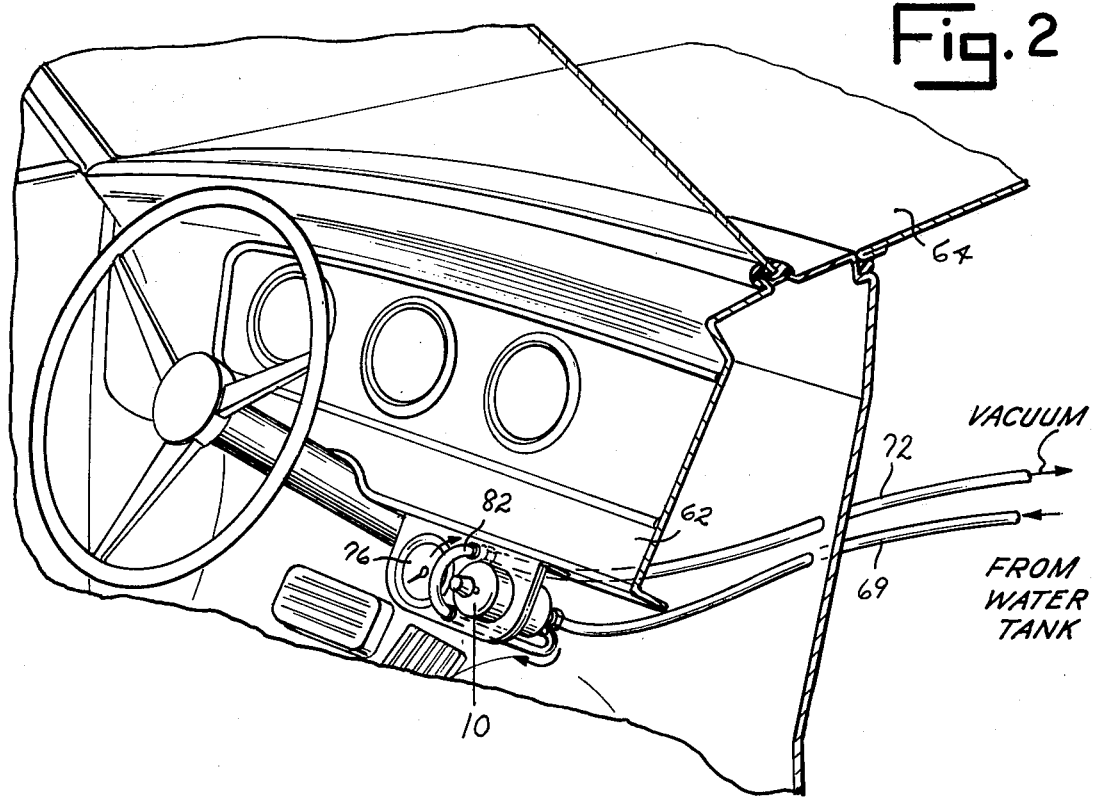
FIG. 2 is a fragmentary perspective view seen along line 2—2 of FIG. 1 of the injector mounted to the dash of the automobile.

Injector 10 is mounted within the driver's compartment of the vehicle within reach of the driver. This is accomplished in the preferred embodiment by providing a bracket member 58 which is secured by a nut and screw combination 60 to the bottom of the instrument panel 62 within the vehicle 64 shown in FIGS. 1 and 2. Housing 12 of injector 10 is provided with a threaded neck 66 which extends through an opening in bracket member 58 with cap 42 being turned upon the threaded neck 66 of the housing and brought to bear against the marginal edge of bracket member 58. Inlet 24 in housing 10 is provided with a fitting 68 which connects a flexible conduit 69 to a reservoir or tank 70 suitably mounted upon vehicle 64. Outlet 22 in injector housing 12 is also provided with a fitting 68 which connects a flexible conduit 72 to the intake manifold of internal combustion engine 74 of vehicle 64. The exact location of the connection of conduit 72 into the intake manifold system of the internal combustion engine can vary, depending upon the specific type of engine. In some constructions of this invention conduit 72 will be connected into the main vacuum line to the brake booster. In other engine constructions the conduit may be connected into the line which connects the crankcase ventilation valve to the intake manifold. In still other engine constructions the conduit may be connected into the passage member which connects the carburetor to the intake manifold. Connection of conduit 72 into the intake manifold should be made at a location which will enable the liquid carried through the conduit to be distributed evenly to all cylinders of the engine.

A vacuum gauge 76 is mounted to bracket member 58 and is connected by a conduit 78 into outlet 22 of the housing by a short connecting passage 80. Conduit 72 which extends between the intake manifold of engine 74 and outlet 22 in injector housing 12 includes a loop part 82 which extends through and projects forwardly of bracket member 58 so as to provide the driver of the vehicle with a visual indication of the liquid flow through the injector.

The liquid, which in the case of the preferred embodiment is water and perhaps an additive to prevent freezing in cold climates, is placed within reservoir 70. Upon operation of vehicle engine 74 a vacuum is created within the cylinders and intake manifold in customary fashion. This vacuum is registered on vacuum gauge 76 and causes the liquid in reservoir 70 to be withdrawn from the reservoir, passing through conduit 69 and housing inlet 24, into housing bore 18, through housing outlet 22 and conduit 72, and into the intake manifold and combustion chambers of the cylinders of engine 74, there mixing with the fuel and air mixture within the cylinder. Most of the liquid in passing through the injector and intake manifold is atomized before its entry into the engine cylinders. As the engine created vacuum is formed within bore 18 of injector housing 12, piston 26 will shift longitudinally within the bore in response to the amount of vacuum. The greater the vacuum created within bore 18, the more closely piston will be drawn toward end wall 16 of the housing.

Spring 30 within housing bore 26 is of a selected strength so as to allow for predetermined amounts of movement of the piston within the bore in response to various amounts of vacuum. In an actual embodiment in which the injector of this invention was utilized with an automobile engine, spring 30 was designed to permit the piston within the injector to shift toward the housing end wall when five inches of vacuum was formed within the housing bore. As the engine created vacuum within housing bore 18 increases, boss 32 of piston 26 is drawn closer to valve seat 52 with valve part 46 entering valve seat 52 as shown in FIGS. 8, 10 and 11. The distance valve part 46 enters valve seat 52 will determine the amount of liquid being drawn through outlet 22 of the housing and passing into engine 74. This rate of liquid flow for a given amount of vacuum can be regulated by turning stem 36 to vary the position of valve part 46 relative to boss 32 of the piston.

In FIG. 12 valve part 46 is spaced substantially from valve seat 52 thus permitting substantially unrestricted flow of liquid between inlet 24 and outlet 22 of the housing. This will occur when the vacuum within bore 18 drops below a prescribed amount, such as during acceleration of vehicle 64, allowing spring 30 to urge the piston away from end wall 16 of the housing. In FIG. 11 boss 32 of the piston has been drawn into contact with the outer face of valve seat 52, indicating an increase in vacuum within bore 18. A transverse channel 84 is formed across the end face of boss 32, as best seen in FIG. 9, so as to provide a passage of liquid when the boss contacts the outer face of valve seat 52. As shown in FIG. 11, valve part 46 carried by the piston is turned so as to be fully seated within valve seat 52, thereby preventing liquid flow through the injector. It is to be understood that in some uses of the injector it may be desirable to have a minute flow of liquid when a sufficient vacuum is created within bore 18 to cause boss 32 to contact the outer face of valve seat 52; in this situation, the operator would rotate stem 36 so as to slightly withdraw the valve part from the valve seat. In FIG. 10 a mid-operating range of the injector is shown, with valve part 46 partially extending into valve seat 52 and with piston boss 36 being spaced from the outer face of the valve seat.

For simplicity of operation and manufacture, stem 36 is preferably coaxial with piston 26. The conical tapers, of valve part 46 and valve seat 52 are preferably the same and in the order of five degrees. O-ring 48 of valve part 46 and O-ring 50 of piston 26 prevent air or moisture from being drawn externally into bore 18. Stem 36 carries a transverse pin 86 which upon approximately one complete turn of the stem contacts a stop pin 84 carried by piston 26. By so limiting the amount of rotation of stem 36, adjustment of the liquid flow rate through the injector is made easier for the ordinary mechanically unskilled driver. The amount of longitudinal movement of valve part 46 in relation to a given amount of rotative movement of stem 26 is determined by the type and size of thread formed upon threaded portion 38 of the stem. When injector 10 is utilized with a V-8 automobile engine, it is anticipated that at five Hg. inches of vacuum approximately twelve fluid ounces of water will flow through the injector and into the cylinders of the automobile engine. When a vacuum greater than 10 inches exists, valve part 46 carried by piston 26 will begin to enter the opening defined by valve seat 52 to substantially reduce the flow rate of water into the vehicle engine. By viewing vacuum gauge 76 and the rate of water flow through loop part 82 in conduit 24, the vehicle operator can turn stem 36 to regulate the rate of liquid or water flow to the vehicle engine to arrive at maximum engine performance.

When no vacuum is drawn within bore 18, spring 30 will cause valve part 46 to be urged away from valve seat 52. This prevents clogging of the injector and allows for "self-cleaning" of the injector valve components.

It is contemplated that the injector of this invention can be utilized as a fuel injector. Also, it is to be understood that the invention is not to be limited to the details above given but may be modified within the scope of the appended claims.

What I claimed is:

1. An injector used in combination with an internal combustion engine for introducing liquid into the cylinders of said engine, the combination comprising said injector including a housing having a bore therein, said engine cylinders constituting a vacuum source, a liquid inlet and a liquid outlet in said housing communicating with said bore, a piston slidably received within said bore and being shiftable between first and second positions therein in response to the amount of vacuum within said bore, said piston in its first position at a minimum vacuum in said bore and in its second position at a maximum vacuum in said bore, said piston carrying valve means shiftable toward one of said outlet and inlet as said piston shifts into its second position for decreasing the flow rate of liquid through the outlet and away from said one outlet or inlet as said piston shifts into its first position for increasing the flow rate of liquid through the outlet, a liquid source, means placing said liquid source in flow communication with said housing inlet, means placing said housing outlet in flow communication with said vacuum source for producing a vacuum within said bore to cause said liquid to be drawn from the liquid source through said housing and into the vacuum source at a flow rate dependent upon the position of said piston within said bore, said housing including an end wall, said one inlet or outlet in said end wall, said piston having an end face in an opposed relationship to said end wall in all operative positions of said piston within said bore, said valve means located at said end face and being positioned at said one inlet or outlet when said piston is in its second position to define in conjunction with said one inlet or outlet a liquid flow regulating orifice.

2. The combination of claim 1 and biasing means between said housing end wall and piston end face and being progressively yieldable in response to the amount of vacuum within said bore for normally urging said piston into its first position.

3. The combination of claim 2 and vacuum indicating means associated with said bore for providing a visual indication of the amount of vacuum in said bore.

4. The combination of claim 2 and means connecting said valve means to said piston for adjustable movement relative to the piston toward and away from said one outlet or inlet independently of said piston movment within said bore.

5. The combination of claim 4 and means for so adjustably moving said valve means relative to said piston externally of said housing.

6. The combination of claim 4 and means for so adjustably moving said valve means relative to said piston.

7. The combination of claim 1 and channel means across said piston end face for defining a liquid flow path between said piston and housing end wall when said piston is shifted into its second position.

8. An injector used in combination with an internal combustion engine for introducing liquid into the cylinders of said engine, the combination comprising said injector including a housing having a bore therein, said engine cylinders constituting a vacuum source, a liquid inlet and a liquid outlet in said housing communicating with said bore, a piston slidably received within said bore and being shiftable between first and second positions therein in response to the amount of vacuum within said bore, said piston carrying valve means shiftable toward and away from said outlet and inlet as said piston shifts between its first and second positions for varying the flow rate of liquid through the outlet, a liquid source, means placing said liquid source in flow communication with said housing inlet, means placing said housing outlet in flow communication with said vacuum source for producing a vacuum within said bore to cause said liquid to be drawn from the liquid source through said housing and into the vacuum source at a flow rate dependent upon the position of said piston within said bore, biasing means being progressively yieldable in response to the amount of vacuum within said bore for normally urging said piston into its first position, said housing including an end wall, at least one of said inlet and outlet in said end wall, said piston having an end face in an opposed relationship to said end wall in all operative positions of said piston within said bore, said valve means located at said end face and being positioned adjacent said one inlet or outlet when said piston is in its second position, a bore extending longitudinally through said piston and opening in said end face, a stem threaded into said bore and including said valve means at one end, the other end of said stem including means for rotating said stem within said piston to move said valve means toward and away from said one inlet or outlet independently of said piston movement.

9. The combination of claim 8 wherein said one inlet or outlet is aligned with said valve means.

10. The combination of claim 8 and means for preventing rotation of said piston within said bore.

* * * * *